April 1, 1952     J. C. WILLIAMS     2,591,326
COUPLING FOR FLEXIBLE PIPES
Filed Nov. 20, 1948
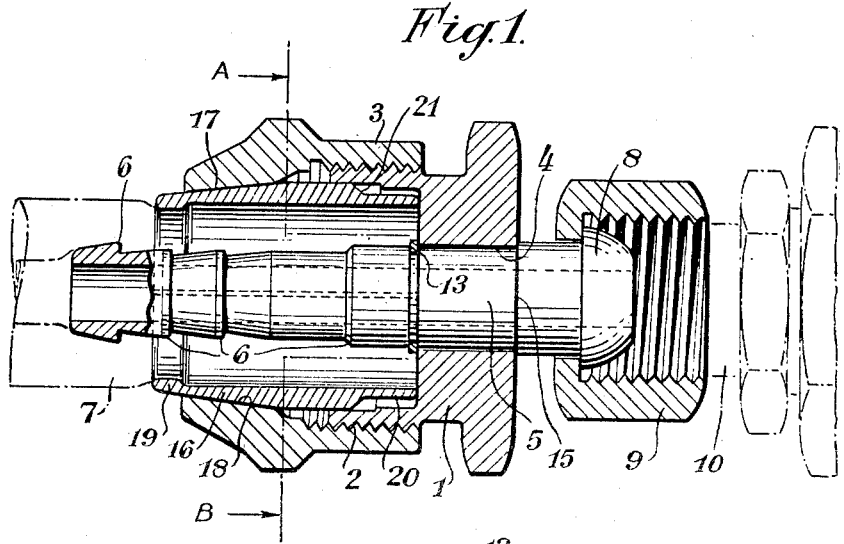
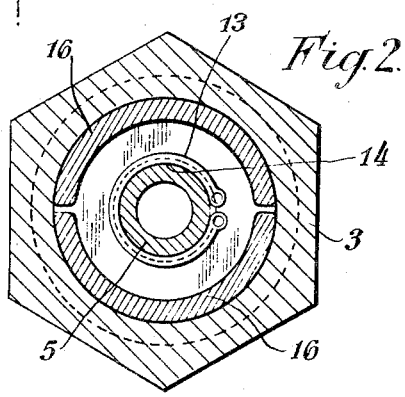
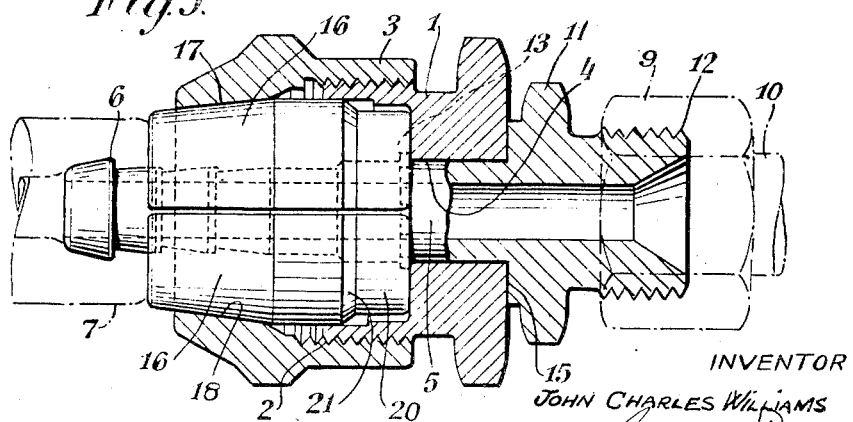
INVENTOR
JOHN CHARLES WILLIAMS
BY
ATTORNEY Patented Apr. 1, 1952

2,591,326

UNITED STATES PATENT OFFICE 2,591,326

COUPLING FOR FLEXIBLE PIPES

John Charles Williams, Slough, England, assignor to High-Pressure Components Limited, London, England Application November 20, 1948, Serial No. 61,230

1 Claim. (Cl. 285—86)

This invention relates to couplings for flexible pipes composed of natural rubber, synthetic rubber, plastics or other material of a flexible nature with or without a woven or other metal armouring embedded in the material constituting the pipe, the chief object being to evolve a coupling which will effectively grip the flexible pipe internally and externally to provide a good seal and withstand a high internal pressure which pressure tends to force the pipe off the coupling and which at the same time can be easily manufactured in quantities with a minimum of wastage of material.

A pipe coupling in accordance with the present invention takes the form of a metal connector comprising an externally or internally screw threaded body, a coaxially arranged tubular protuberance constructed separately from said body and located within an axially arranged boring therein and adapted to fit closely within the end of the flexible pipe, a longitudinally split radially contractible collet for fitting around that part of the pipe surrounding said protuberance and entering said body, said collet being externally tapered in a longitudinal direction and an internally tapered sleeve nut for engaging screw threads on said body and the external surface of said collet to contract same into gripping engagement with said pipe as a result of screwing said sleeve nut on to or into said body and means for locating said protuberance in position within said body.

The protuberance at the end opposite to that receiving the pipe may be externally screw threaded or otherwise formed for attachment to the fitting to which the pipe is to be connected, or alternatively the body may be thus formed and in the case of a coupling intended for connecting two flexible pipes in end-to-end relationship the body will carry two oppositely directed protuberances or a double ended protuberance, the body being adapted to receive two nuts and their associated split collets.

Although the protuberance may be, for example, a force fit in the body it is preferred to maintain the protuberance in position by means of a circlip engaging a peripheral recess in the protuberance and an adjacent face of the body, axial movement of the protuberance within the body being thereby prevented.

In order that the invention may be clearly understood and readily carried into effect the invention is hereinafter described with reference to the accompanying drawings in which:

Figure 1 is a longitudinal section through a pipe coupling constructed in accordance with the invention:

Figure 2 is a transverse section on the line A—B in Figure 1:

Figure 3 is a longitudinal section of a slightly modified form.

In the two embodiments of the invention illustrated, the body 1 is externally screw threaded as at 2 to receive a sleeve nut 3, the body being formed with an axially arranged parallel sided hole 4 for the reception of the protuberance 5 the latter being formed with a series of annular surfaces apart throughout its length to provide a series of annular ridges 6 which when the protuberance is forced into the interior of the flexible pipe 7 grip the interior surface thereof and give a good seal between the flexible pipe and the protuberance.

The protuberance at its opposite end is either as shown in Figure 1 formed with an enlarged part spherical head 8 which under the action of a sleeve nut 9 engages a seating in the end of a spigot 10 to which the coupling is to be attached or as shown in Figure 3 is formed with an enlarged head 11 having hexagonal or other flats for the reception of a spanner, the extremity 12 of the protuberance being screw-threaded for its attachment to the spigot like fitting 10 by means of the nut 9. The protuberance is bored axially, the diameter of the boring corresponding substantially with the internal diameter of the flexible pipe, the protuberance being a force fit into the end of the pipe.

The protuberance is maintained in position within the body by means of a circlip 13 which is sprung into position after the protuberance has been passed through the body, the circlip engaging a peripheral groove 14 in the protuberance and thereby firmly locating the protuberance against axial movement with respect to the body in the one direction, the protuberance having an annular shoulder 15 which engages the body and prevents movement of the protuberance in the opposite direction.

Located within the body is a longitudinally split collet 16, the collet being preferably formed in two or more parts and being externally tapered as at 17 over the greater part of its length for engagement by the inner tapering surface 18 of the sleeve nut. Furthermore, the collet at its outer end is preferably formed with a peripheral internally arranged lip 19 which bites into the external surface of the flexible pipe as a result of tightening up the sleeve nut.

The collet at its opposite end is reduced in diameter as at 20 and is formed with a tapering part 21 which when the collet is being forced axially into position can engage the inner peripheral edge of the body to provide a lead to force the parts of the collet radially inwards into a position in which the full diameter parallel sided part of the collet can enter the body. In Figures 1 to 3 the collet is shown in the fully home position in which its extremity engages the inner face of the body. The parts 20 can be pressed into the body when assembling the fitting around the flexible pipe thereby holding the component parts of the collet in position preparatory to passing the sleeve nut over the collet and into engagement with the screw threads formed on or in the body.

The arrangement is such that by tightening the sleeve nut 3 the parts of the collet are directed into gripping engagement with the flexible pipe, the flexible pipe being squeezed between the collet and the protuberance, the collet at the same time being forced axially into contact with the inner face of the body. In this way the extremity of the pipe will be effectively gripped and will be restrained against any likelihood of its being forced off the protuberance as a result of internal pressure, the arrangement of the annular projections on the protuberance ensuring a good seal against leakage of fluid. The body and also the nut may be formed with hexagonal or other flats for the reception of a spanner when tightening the coupling.

In the case of the fitting being used for a flexible pipe incorporating a woven or other armouring material, the coupling may be used as in the manner disclosed by prior British Patent No. 564,515 in which case the armouring, after the rubber or other flexible material has been removed internally and externally for a short distance, will be gripped between the end of the collet and the body as the result of tightening the nut, thereby locking the flexible pipe against axial movement and enabling the pipe to withstand quite high internal pressures without the tendency for displacement of the pipe off the protuberance in an axial direction.

Although in the preferred form the locating means for maintaining the protuberance in position relative to the body takes the form of a circlip it is within the scope of the invention to employ any other suitable means for this purpose, and if desired the protuberance itself may merely be a force fit into the boring in the body so as to ensure the parts being held firmly together.

By constructing the protuberance separately the same pattern of protuberance may be used with a variety of bodies and furthermore the manufacture of the coupling is facilitated and cheapened.

What I claim is:

A pipe coupling for connection to the end of a flexible hose comprising an externally threaded hollow cylindrical body open at one end, a coaxial tubular protuberance extending through the closed end of said body and fixed thereto for positioning within the end of a flexible hose extending into said body, a pair of separate opposed substantially semi-cylindrical members combining to provide a radially contractible collet for fitting around that part of the flexible hose within which the tubular protuberance engages, the outer surfaces of said members being formed with reduced radius portions at one end of right semi-cylindrical conformation so that said collet forming members may be manually assembled on the hose and the reduced radius portions initially extended into said cylindrical body to be held in place by the latter, said semi-cylindrical members being formed with inclined shoulders extending from said reduced radius portions to the portions of the outer surface thereof of increased radius, said portions of increased radius of said members tapering towards the other end, and an internally threaded sleeve nut for threaded engagement with said body and formed with a tapered internal surface for engagement with the tapered portions of the outer surfaces of said collet forming members to contract the latter radially into gripping engagement with the hose and to move said members axially against the closed end of said body.

JOHN CHARLES WILLIAMS.

REFERENCES CITED

The following references are of record in the file of this patent:

UNITED STATES PATENTS

| Number | Name | Date |
| --- | --- | --- |
| 1,532,886 | Cowles | Apr. 7, 1925 |
| 2,120,275 | Cowles | June 14, 1938 |
| 2,464,416 | Raybould | Mar. 15, 1949 |